United States Patent
Rai et al.

(10) Patent No.: US 10,423,754 B1
(45) Date of Patent: Sep. 24, 2019

(54) ELECTROSTATIC DISCHARGE CELL PLACEMENT USING EFFECTIVE RESISTANCE

(71) Applicant: Cadence Design Systems, Inc., San Jose, CA (US)

(72) Inventors: Nityanand Rai, Noida (IN); Xin Gu, Austin, TX (US); Zhiyu Zeng, Austin, TX (US)

(73) Assignee: CADENCE DESIGN SYSTEMS, INC., San Jose, CA (US)

(*) Notice: Subject to any disclaimer, the term of this patent is extended or adjusted under 35 U.S.C. 154(b) by 0 days.

(21) Appl. No.: 15/730,380

(22) Filed: Oct. 11, 2017

(51) Int. Cl.
*G06F 17/50* (2006.01)

(52) U.S. Cl.
CPC ...... *G06F 17/5081* (2013.01); *G06F 2217/02* (2013.01)

(58) Field of Classification Search
USPC .......................................................... 716/115
See application file for complete search history.

(56) References Cited

U.S. PATENT DOCUMENTS

| | | | |
|---|---|---|---|
| 8,079,002 B1* | 12/2011 | Lo | G06F 17/5068 716/102 |
| 9,619,604 B1 | 4/2017 | Rai et al. | |
| 2006/0075368 A1* | 4/2006 | Bakir | G06F 17/5072 716/122 |
| 2008/0104554 A1* | 5/2008 | Kobayashi | G06F 17/5036 716/112 |
| 2010/0165522 A1* | 7/2010 | Stockinger | G06F 17/5068 361/56 |

* cited by examiner

*Primary Examiner* — Eric D Lee
(74) *Attorney, Agent, or Firm* — Foley & Lardner LLP (57) ABSTRACT

In general, the present embodiments are directed to designing an electronic system such as an IC, and more particularly to a design technique that can determine an optimal number and placement of ESD cells in a design for an IC. In embodiments, the technique includes determining an effective resistance criteria between a set of candidate ESD cells to the bumps/pads of the IC and finding a minimum set of ESD cells that covers all the bumps/pads. In embodiments, the technique is employed at the early stage of the design of the IC.

20 Claims, 6 Drawing Sheets

- VERSION 5.8 ;
- DIVIDERCHAR "/" ;
- BUSBITCHARS "[]" ;
- DESIGN sasg1_top ;
- UNITS DISTANCE MICRONS 1000 ;
- COMPONENTS 5 ;
- - ESDCLAMP_1V2_INH_2M4PINS_inst_11 ESDCLAMP_1V2_INH_2M4PINS + SOURCE DIST + FIXED ( 1352280 2822715 ) N ;
- - ESDCLAMP_1V2_INH_2M4PINS_inst_119 ESDCLAMP_1V2_INH_2M4PINS + SOURCE DIST + FIXED ( 3515850 4077255 ) N ;
- - ESDCLAMP_1V2_INH_2M4PINS_inst_132 ESDCLAMP_1V2_INH_2M4PINS + SOURCE DIST + FIXED ( 3780300 2195445 ) N ;
- - ESDCLAMP_1V2_INH_2M4PINS_inst_25 ESDCLAMP_1V2_INH_2M4PINS + SOURCE DIST + FIXED ( 1893150 3449985 ) N ;
- - ESDCLAMP_1V2_INH_2M4PINS_inst_66 ESDCLAMP_1V2_INH_2M4PINS + SOURCE DIST + FIXED ( 2704500 5018160 ) N ;
- END COMPONENTS
- SPECIALNETS 1 ;
- - vdd ( ESDCLAMP_1V2_INH_2M4PINS_inst_11 VDDCORE1V2 ) ( ESDCLAMP_1V2_INH_2M4PINS_inst_119 VDDCORE1V2 ) ( ESDCLAMP_1V2_INH_2M4PINS_inst_132 VDDCORE1V2 ) ( ESDCLAMP_1V2_INH_2M4PINS_inst_25 VDDCORE1V2 ) ( ESDCLAMP_1V2_INH_2M4PINS_inst_66 VDDCORE1V2 )
- + USE POWER ;
- END SPECIALNETS
- END DESIGN

ELECTROSTATIC DISCHARGE CELL PLACEMENT USING EFFECTIVE RESISTANCE

TECHNICAL FIELD

The present embodiments relate generally to electronic systems, and more particularly to protecting against electrostatic discharge events in such systems, including protection techniques that can be incorporated into the design of integrated circuits.

BACKGROUND

Electronic design automation (EDA) tools are used to design and analyze electronic systems such as printed circuit boards (PCBs) and integrated circuits (ICs, e.g., application specific integrated circuits (ASICs) or systems on chips (SOCs)). ICs can include many thousands and perhaps millions of circuit elements (e.g., transistors, logic gates, diodes, etc.) and interconnecting wires and busses, as well as power grids for the circuit elements. The circuit elements and wires can be formed on many different layers, with various interconnections (e.g., vias) between layers.

Some EDA tools are configured to attempt to handle the issue of electrostatic discharge ("ESD"). ESD generally relates to the transfer of charge between bodies at different electrical potentials. More particularly in connection with ICs, an ESD event can be caused either by Human touch (HBM) or during machine testing (MM/CDM) of the IC. An ESD event may alter the electrical characteristics of a semiconductor device, and may even degrade or destroy the device. As ESD is a high surge current event, it has become a major reliability problem in the semiconductor industry.

Although conventional EDA tools can assist in providing some protection for an IC design against ESD events, further improvements remain desirable.

SUMMARY

In general, the present embodiments are directed to designing an electronic system such as an IC, and more particularly to a design technique that can determine an optimal number and placement of ESD cells in a design for an IC. In embodiments, the technique includes determining an effective resistance criteria between a set of candidate ESD cells to the bumps/pads of the IC and finding a minimum set of ESD cells that covers all the bumps/pads. In embodiments, the technique is employed at the early stage of the design of the IC.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

In general, the present embodiments are directed to designing an electronic system such as an IC, and more particularly to a design technique that can determine the optimal number and placement of ESD cells satisfying the minimum effective resistance criteria to the bumps/pads of the IC. In embodiments, the technique is employed at the early stage of the design of the IC.

Figure 1:
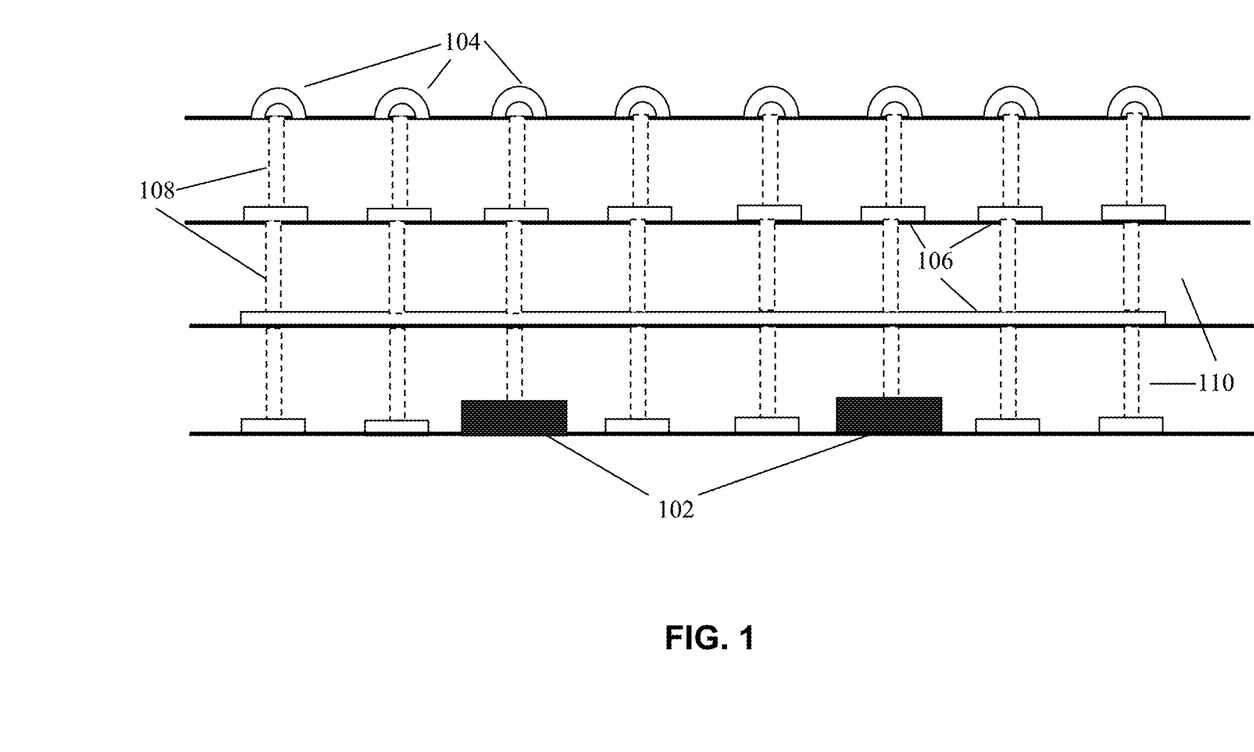
FIG. 1 is a diagram illustrating aspects of protecting against ESD in a design of an IC.

FIG. 1 is a diagram illustrating aspects of protecting against ESD in an example IC design.

In order to protect the functional modules in ICs from ESD events, protection cells 102 are often utilized, generally between the functional modules of the IC and the input/output ("I/O") terminals 104 (e.g., bumps, pins, pads, etc.) of the IC. For example, for ESD protection, it is often required that for each bump 104 in the IC there exists an ESD cell 102 through which its static charge can be discharged without damaging the devices. To ensure that static charge on a bump is discharged only through the ESD devices 102, it is necessary to ensure that the effective electrical resistance of the bump is below an identified threshold so that the static charge does not go through any other device (not shown) connected to the bump 104. In order to ensure this, a large number of effective electrical resistances need to be calculated from multiple sources (e.g., pads 104 on the order of thousands) to multiple destinations (e.g., devices 102 on the order of thousands).

Design engineers design ICs by transforming logical or circuit descriptions of the IC's into geometric descriptions, called layouts. IC layouts typically include circuit modules (e.g., geometric representations of electronic or circuit IC components) with signal pins, and interconnections 106 (e.g., geometric representations of signal wiring and vias 108) that connect the signal pins of the circuit modules. Each IC also contains a power grid structure that provides power and ground to each electronic and circuit component of an IC from certain ones of bumps 104. Each electronic or circuit IC component has a power pin and a ground pin that is connected to the power grid structure. Power grid structure components include stripes and rails such as interconnections 106, and vias such as 108.

As set forth above, ESD cells 102 are used to protect all of the I/O and power pins 104 from ESD events. The present applicants recognize several problems in connection with the placement of ESD cells in a conventional IC design flow. For example, the placement of the ESD cell 102 in the design is typically done in a brute force manner during a later stage of the design such as a post-layout or signoff stage in which a designer places cells 102 in layers 110 and locations very close to each pin 104 in the design, followed by ESD verification at a signoff stage. If any ESD violation is found in the ESD verification stage, either more cells 102 are added to the design or existing cells 102 are re-placed. This step iterative in nature and is very costly. Moreover, ESD cells are relatively big in size and hence require significant silicon area. So in some other brute force design techniques in which one ESD cell 102 is provided for each I/O pin 104, the silicon required for these cells 102 may end up unnecessarily overwhelming the design of the IC.

Accordingly, the present embodiments provide an algorithm which can determine the optimal number of ESD cells meeting a desired protection effective resistance criteria to the bumps/pads for a given design and place the ESD cells automatically in the design.

Figure 2:
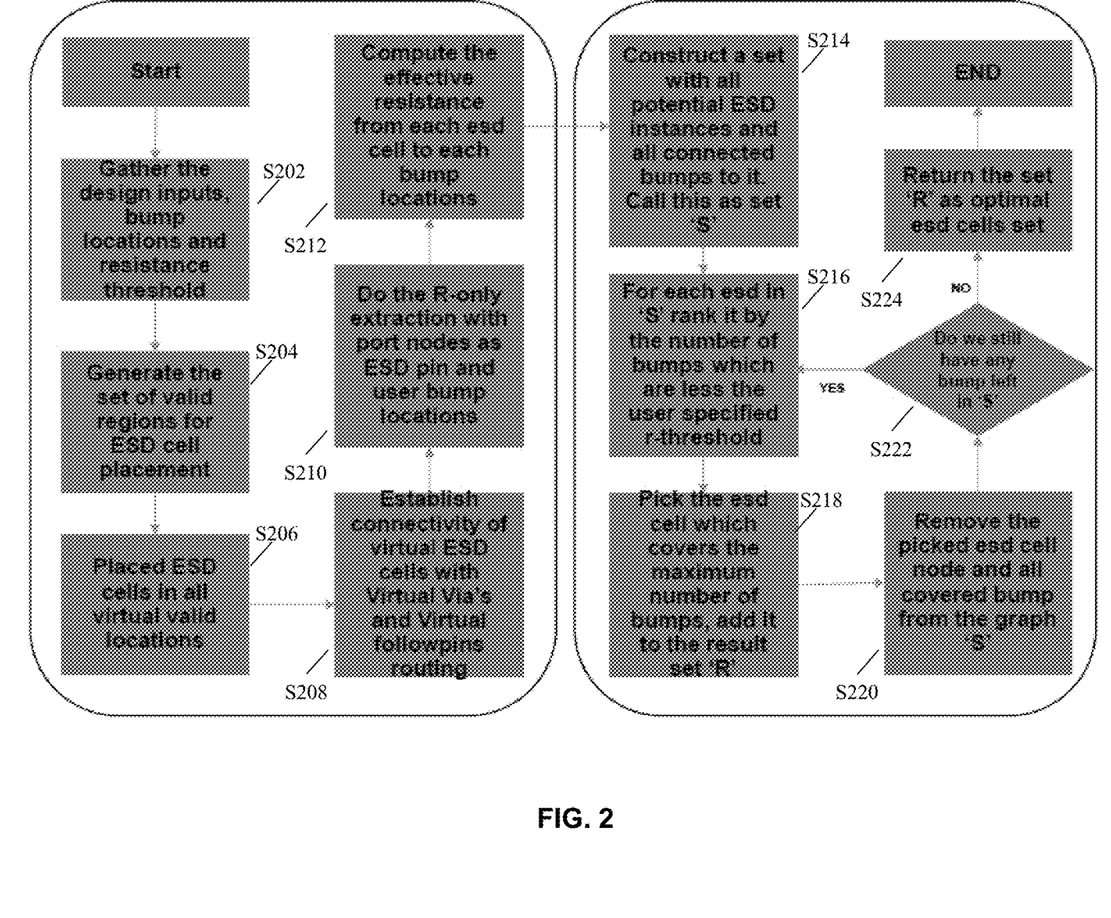
FIG. 2 is a flow chart illustrating an example methodology for generating and placing an optimal set of ESD cells in an IC design according to embodiments.

FIG. 2 is a flowchart illustrating an example methodology according to the present embodiments.

In a first step S202, all the design inputs and bump locations for the electronic system (e.g., IC) being designed are identified, as well as ESD specific inputs such as the specified effective resistance threshold to the ESD cells. The design inputs that are received can depend on the stage of the design. Preferably, however, this process is performed during a relatively early stage of the design, such as after floorplanning and power grid definition have been performed, but before a full layout of all of the instances in the design has been performed. In this case, the design inputs can include the locations and boundaries within the integrated circuit design for all the sub-chips or blocks identified by the designer(s), all the macrocells (i.e. macros) in the design, the power domain regions, the power grid definition for each of the blocks, including the locations and sizes of the wires and vias that form the power grid, as well as the ESD cell lef for the ESD cells to be placed.

In a next step S204, the set of valid regions for ESD cell placement in the silicon layer are identified. This step includes filtering out the areas of any user specified blockage or already placed macro/cell areas that are identified in the design inputs in the preceding step.

Figure 3:
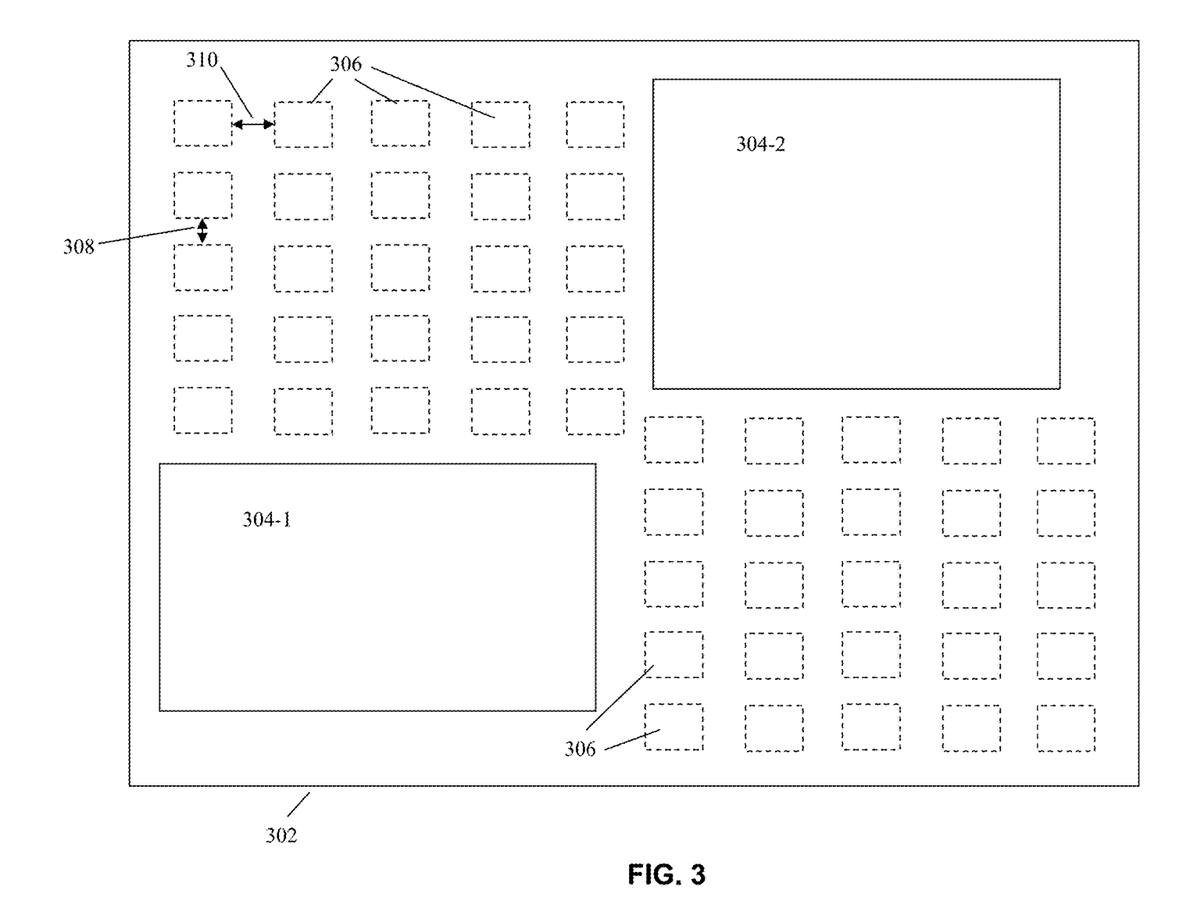
FIG. 3 is a diagram illustrating aspects of identifying candidate locations for ESD cells in a methodology according to embodiments.

In a next step S206, candidate locations for ESD cells are placed in the set of valid regions identified in the preceding step. This can be done in a uniform way and can be user controlled such as in the form of a specified x/y pitch so as to generate more practical locations. For example, as shown in FIG. 3, a design for a layer 302 of the IC can include areas 304-1 and 304-2 which have been reserved by a designer in the floorplanning stage, for example. The locations and boundaries of these areas 304-1 and 304-2 can be included in the design inputs received in the initial step. As further illustrated, potential ESD cell locations 306 have been further placed in the design for layer 302, with a height and width that is determined by the ESD cell to be used. In this example, the cell locations 306 are all separated by a specified pitch 308 in the y direction and a specified pitch 310 in the x direction, the x and y pitches either being the same or different. However, it should be noted that many variations to the placement of potential cell locations 306.

In one example, candidate locations for the ESD cells are placed at all possible valid regions of the layer 302. In other examples, there may be a practical limit imposed on the number of possible valid regions, for computational efficiency purposes for example.

Figure 4:
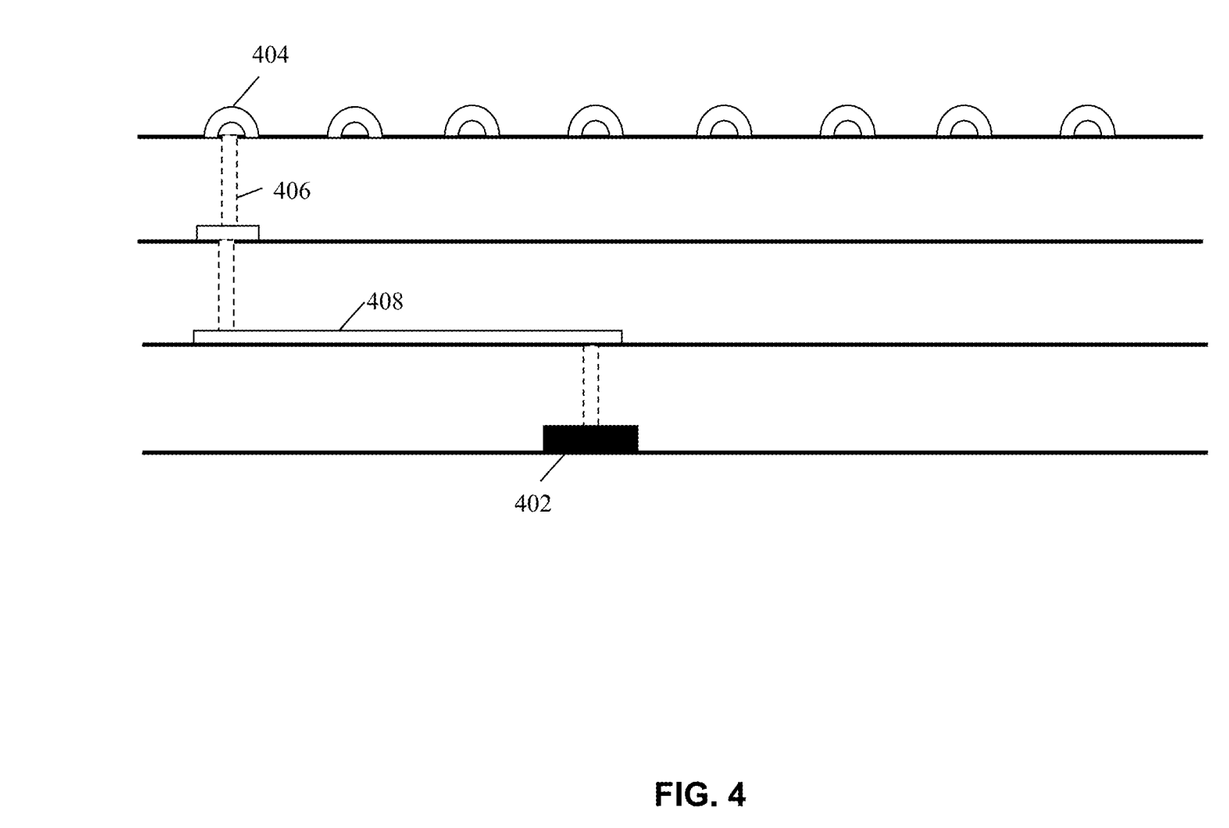
FIG. 4 is a diagram illustrating aspects of determining an effective resistance for potential ESD cells in a methodology according to embodiments.

In a next step S208, the connectivity between the placed ESD cell locations 306 and the existing grid of bumps is established using virtual vias or virtual follow pins. For example, as shown in FIG. 4, a candidate location 402 for one of the potential ESD cells has been specified on layer 404 of the IC design in the preceding step. The connection between this potential ESD cell at location 402 is established to each one of the bumps 404. As shown in this example, the connection can include virtual vias 406 and virtual follow pins 408. The term "virtual" is used here to distinguish between actual components in the design and the vias and pins that are being created only for the purpose of the analysis of the present embodiments.

In a next step S210, the grid of all the virtual vias and virtual follow pins between the potential ESD cells and the bump locations generated in the preceding step is extracted and in step S212, the effective resistance from each candidate ESD cell to each bump location is calculated. One example of how this grid can be extracted and how the effective resistance can be calculated is described in U.S. Pat. No. 9,619,604, the contents of which are incorporated herein by reference in their entirety.

Now that the effective resistance between each bump and each potential ESD cell is known, a next step is to find the minimum set of ESD cells where the minimum effective resistance to each bump to each ESD cell in the set is less than the specified threshold. This is a standard set cover problem (e.g., NP-complete) but it can be solved approximately using a greedy approach. In general, embodiments use an iterative process in which, at each step, the ESD cell that covers maximum number of bumps with an effective resistance less than the specified threshold. This process is repeated until uncovered bumps are left. The process is bound to converge since there is at least one ESD cell placed with each bump in the above example steps.

More particularly, as shown in FIG. 2, the process continues in step S214 by constructing a set with all potential ESD instances having an effective resistance less than the specific threshold and all bumps connected to them, which set is dubbed set S. Next an iterative process is performed for each ESD cell in S, starting in step S216, where each ESD cell in the set is ranked by the number of bumps to which its effective resistance is less than the user-specified resistance threshold. Next in step S218, the ESD cell from the ranked list that covers the maximum number of bumps is picked and added to the result set R.

In a next step S220, the picked ESD cell and all the covered bumps are removed from the graph S. In a next step S22, it is determined whether any bumps remain in S. If not, processing returns to step S216. Otherwise, processing advances to a final step S224 where the final set R of optimal ESD cells and their locations is returned.

The generated result R is not a theoretically optimum set (e.g., as it would be for a NP-complete problem), but is a minimum set in practice which meets the given user effective resistance criteria, and is bounded by a ratio of H(n), where H(n) is harmonic nth harmonic number and n is number of bumps to be covered.

Figure 5:
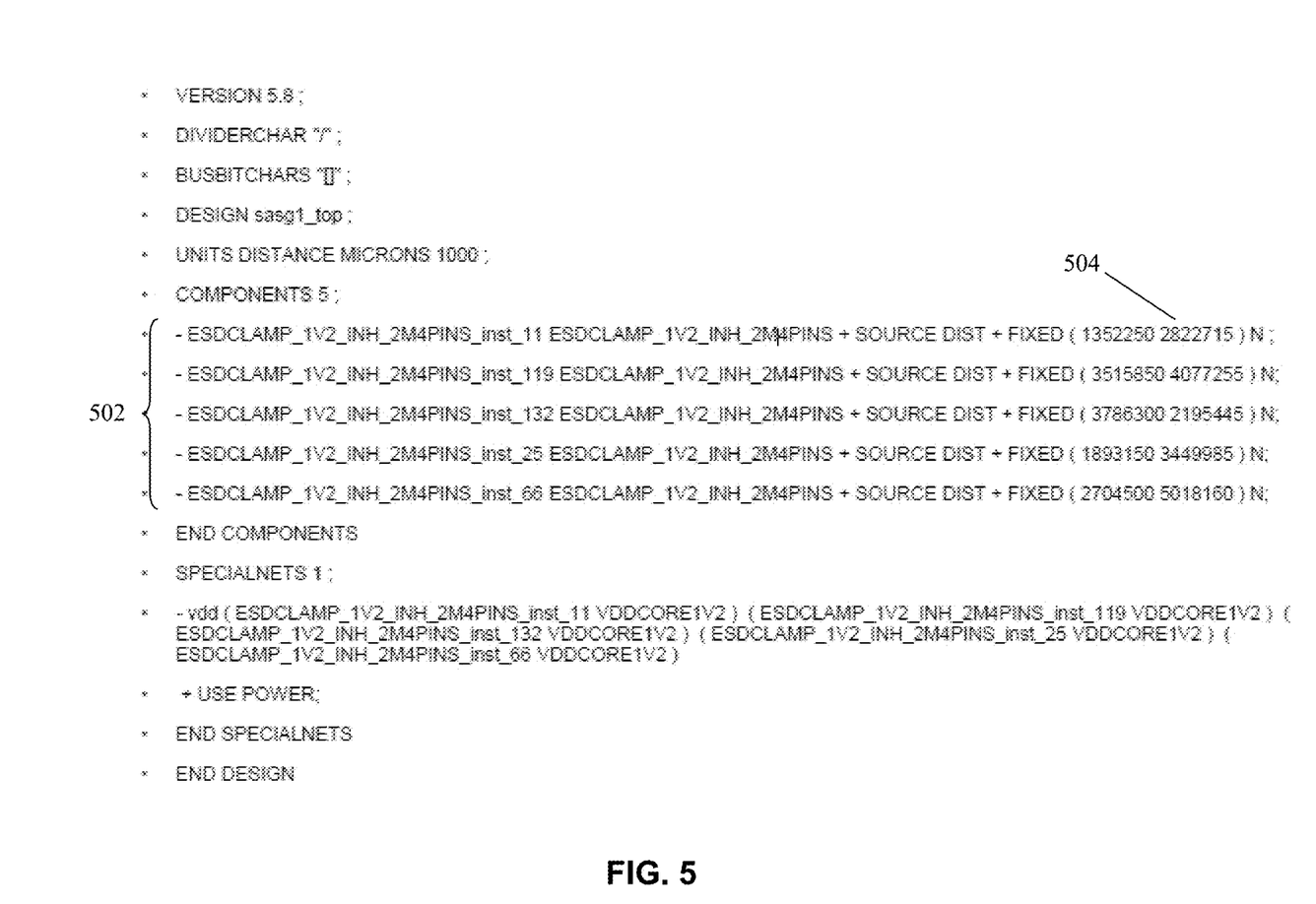
FIG. 5 illustrates an example form of providing an optimal set of ESD cells for an IC design according to embodiments.

In embodiments, the output from the process performed as described in connection with FIG. 2 (e.g. the set R of ESD cell locations) is used to produce an incremental floorplan and placement description such as a DEF file. Such a description can be directly sourced into the electronic circuit (e.g., IC) design (e.g., via an EDA tool), to view the number and placement of the ESD cells in the generated optimal cell locations of the design. An example is shown in FIG. 5. In this simplified example, the DEF file has a field describing the set R which includes five ESD cells 502, each having a respective defined location 504 in the electronic circuit design.

Figure 6:
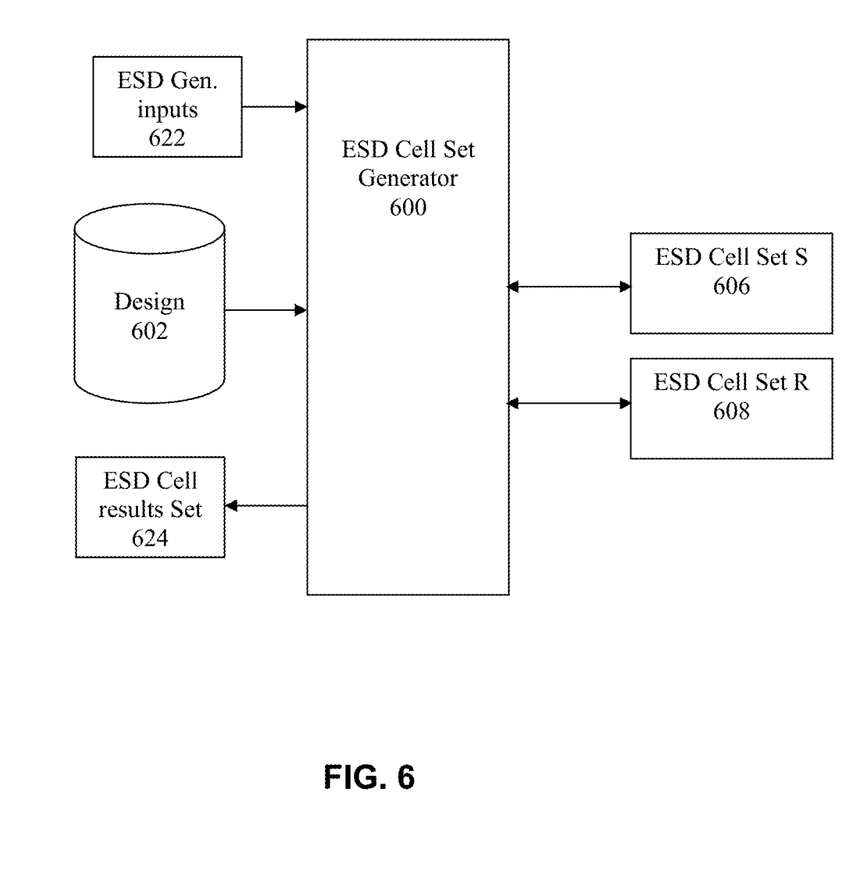
FIG. 6 is a block diagram illustrating an example system for generating and placing an optimal set of ESD cells in an IC design according to embodiments.

FIG. 6 is a block diagram illustrating an example system according to the present embodiments.

As shown in FIG. 6 this example system includes a ESD cell generator 600. In accordance with aspects of the present embodiments, generator 600 implements a methodology for generating and placing minimal set of ESD cells for a design such as that described above in connection with FIG. 2.

As shown in this example, generator 600 operates on the design 602 to produce ESD cells 624. As set forth above, design 602 can comprise a full-chip description of an integrated circuit including the locations and boundaries within the integrated circuit design for all the sub-chips or blocks identified by the designer(s), all the macrocells (i.e. macros) in the design, the power domain regions, and the power grid definition for each of the blocks, including the locations and sizes of the wires and vias that form the power grid. For example, the design 602 can include information in the form of DEF files, GDS files, lef files, technology files and cell library files.

In this example, in addition to design 602, generator 600 receives ESD inputs 622. As set forth above, this can include an effective resistance threshold, a user-defined separation between cells such as an x/y pitch specification, and a preferred ESD cell description, such as a cell library file.

As further shown in FIG. 6, based on the design, generator 600 constructs a ESD cell and bump set S 606 and an ESD cell results set R 608 as described above in connection with the flowchart in FIG. 2. At the conclusion, generator 600 provides ESD cell results set R 624, which can be in the form of a DEF file such as that shown in FIG. 5.

It should be noted that generator 600 can be implemented in various ways. For example, generator 600 can be implemented by one or more general purpose computers that are loaded with an operating system executing software and/or customized to include hardware for generating and placing a minimal set of ESD cells using the functionality of the present disclosure. In some embodiments, the one or more computing systems comprise and/or communicate with various components not shown such as the processor(s) or processor core(s), memory, disks, etc. The one or more computing systems may further write to and read from a local or remote volatile or non-volatile computer accessible storage not shown that stores thereon data or information such as, but not limited to, design 602, inputs 622 and results 624, and can include one or more databases such as physical design database(s), libraries, data, rule decks, constraints, etc. and/or other information or data that may be required to support the methodology of the present embodiments. In some embodiments, the one or more computing systems are implemented in a "cloud" configuration and/or a client/server configuration. For example, one or more server computers may be loaded with application software for implementing some or all of the methodology of the present embodiments, and one or more client computers can communicate with the server computer(s) via a network to perform some or all of the methodology of the embodiments for a particular design. Such computing systems can further include one or more computing systems loaded with user interface functionality for providing designers with controls for initiating the performance of simulations for a particular design, providing any user-required inputs 622 and to view the results 624.

In these and other embodiments, generator 600 can be implemented using one or more existing electronic design automation (EDA) tools such as IC electrical analysis tools, floorplanning tools, power grid analysis and optimization tools, design implementation tools, power integrity tools, etc. Those skilled in the art will understand how to adapt such existing tools after being taught by the present disclosure. Additionally or alternatively, some or all of generator 600 can be implemented using standalone or other versions of the above described EDA software, and can possibly be adapted to communicate with components such as existing EDA tools.

Although the present embodiments have been particularly described with reference to preferred ones thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A method for incorporating protection against electrostatic discharge (ESD) for an integrated circuit, the method comprising:
   identifying a design of the integrated circuit (IC);
   identifying a set of bumps in the IC design;
   identifying a plurality of candidate ESD cell locations in the IC design;
   computing an effective resistance between each of the bumps and each of the plurality of candidate ESD cell locations, the computing being performed by establishing virtual connections between the bumps and the candidate ESD cell locations; and
   selecting a minimum set of final ESD cell locations from among the plurality of candidate ESD cell locations based on the computed effective resistance, and as compared to a threshold resistance,
   wherein placement of ESD cells in the set of final ESD cell locations of the IC design improves protection against ESD for the IC fabricated according to the IC design.

2. The method of claim 1, wherein identifying the plurality of candidate ESD cell locations includes identifying a region in the design that is not reserved for one or more functional cells of the IC and filling the region with a set of the plurality of candidate ESD cell locations.

3. The method of claim 2, wherein filling includes generating the set of candidate ESD cell locations at a uniform spacing.

4. The method of claim 1, wherein computing the effective resistance includes:

extracting a resistance-only grid between the candidate ESD cell locations and the bumps using the virtual connections.

5. The method of claim 4, wherein establishing the virtual connections includes identifying one or both of a virtual via and a virtual follow pin in the IC design.

6. The method of claim 1, wherein selecting includes creating a set of potential ESD cell locations by eliminating certain of the plurality of the candidate ESD cell locations for which the computed effective resistance exceeds the threshold resistance.

7. The method of claim 6, further comprising, for each potential ESD cell location, ranking the number of bumps covered by an ESD cell at each potential ESD cell location.

8. The method of claim 7, further comprising picking one of the set of potential ESD cell locations based on the ranking.

9. A computer program product comprising a non-transitory computer readable storage medium having instructions recorded thereon which, when executed by a processor, cause the processor to perform a method for incorporating protection against electrostatic discharge (ESD) for an integrated circuit, the method comprising:
identifying a design of the integrated circuit (IC);
identifying a set of bumps in the IC design;
identifying a plurality of candidate ESD cell locations in the IC design;
computing an effective resistance between each of the bumps and each of the plurality of candidate ESD cell locations, the computing being performed by establishing virtual connections between the bumps and the candidate ESD cell locations; and
selecting a minimum set of final ESD cell locations from among the plurality of candidate ESD cell locations based on the computed effective resistance, and as compared to a threshold resistance,
wherein placement of ESD cells in the set of final ESD cell locations of the IC design improves protection against ESD for the IC fabricated according to the IC design.

10. The computer program product of claim 9, wherein identifying the plurality of candidate ESD cell locations includes identifying a region in the design that is not reserved for one or more functional cells of the IC and filling the region with a set of the plurality of candidate ESD cell locations.

11. The computer program product of claim 10, wherein filling includes generating the set of candidate ESD cell locations at a uniform spacing.

12. The computer program product of claim 9, wherein computing the effective resistance includes:
extracting a resistance-only grid between the candidate ESD cell locations and the bumps using the virtual connections.

13. The computer program product of claim 12, wherein establishing the virtual connections includes identifying one or both of a virtual via and a virtual follow pin in the IC design.

14. The computer program product of claim 9, wherein selecting includes creating a set of potential ESD cell locations by eliminating certain of the plurality of the candidate ESD cell locations for which the computed effective resistance exceeds the threshold resistance.

15. The computer program product of claim 14, further comprising, for each potential ESD cell location, ranking the number of bumps covered by an ESD cell at each potential ESD cell location.

16. The computer program product of claim 15, further comprising picking one of the set of potential ESD cell locations based on the ranking.

17. A system for incorporating protection against electrostatic discharge (ESD) for an integrated circuit, the system comprising:
storage for a design of the integrated circuit (IC);
an ESD cell set generator that is coupled to the storage and is configured to:
identify a set of bumps in the IC design;
identify a plurality of candidate ESD cell locations in the IC design;
compute an effective resistance between each of the bumps and each of the plurality of candidate ESD cell locations, the ESD cell set generator being configured to compute the effective resistance by establishing virtual connections between the bumps and the candidate ESD cell locations; and
select a minimum set of final ESD cell locations from among the plurality of candidate ESD cell locations based on the computed effective resistance, and as compared to a threshold resistance,
wherein placement of ESD cells in the set of final ESD cell locations of the IC design improves protection against ESD for the IC fabricated according to the IC design.

18. The system of claim 17, wherein the ESD cell set generator is further configured to receive an ESD cell description, the ESD cell set generator using the ESD cell description to identify the plurality of candidate ESD cell locations.

19. The system of claim 17, wherein the ESD cell set generator is further configured to operate after a floorplanning stage of the design but before a full layout of the design is performed.

20. The system of claim 17, wherein the ESD cell set generator is further configured to generate a DEF file describing the set of final ESD cell locations.

* * * * *